United States Patent [19]

Zeitler et al.

[11] 4,064,198

[45] Dec. 20, 1977

[54] PROCESS FOR THE MANUFACTURE OF SHAPED ARTICLES BY GRAFT POLYMERIZATION

[75] Inventors: Gerhard Zeitler, Hessheim; Lothar Hoehr, Worms; Heinz Mueller-Tamm, Ludwigshafen, all of Germany

[73] Assignee: BASF Aktiengesellschaft, Ludwigshafen (Rhine), Germany

[21] Appl. No.: 679,021

[22] Filed: Apr. 21, 1976

Related U.S. Application Data

[63] Continuation of Ser. No. 497,328, Aug. 14, 1974, abandoned.

[30] Foreign Application Priority Data

Aug. 17, 1973  Germany ........................ 2341556

[51] Int. Cl.² .................... C08F 263/04; C08F 265/04
[52] U.S. Cl. .............................................. 260/878 R
[58] Field of Search .................................. 260/878 R

[56] References Cited

U.S. PATENT DOCUMENTS

| | | | |
|---|---|---|---|
| 3,162,696 | 12/1964 | Zimmerman et al. | 260/878 R |
| 3,218,373 | 11/1965 | Salyer | 260/878 R |
| 3,565,780 | 2/1971 | Zimmerman | 260/878 R |
| 3,949,019 | 4/1976 | Zeitler et al. | 260/878 R |

*Primary Examiner*—Alan Holler
*Attorney, Agent, or Firm*—Keil, Thompson & Shurtleff

[57] ABSTRACT

Process for the manufacture of shaped articles of a mixture of polystyrene and a copolymer of ethylene with vinyl ester, acrylate or methacrylate. To this end, the said copolymers having a content of from 3 to 40% by weight of unsaturated ester are reacted with monomeric styrene in aqueous suspension in the presence of free-radical polymerization initiators. Whereas a portion of the styrene used is directly grafted onto the ethylene copolymer, the remainder of the polymerized styrene is present in a finely divided state as a homopolymer beside or within the grafted ethylene copolymer. There are obtained homogeneous shaped articles having a styrene content of more than 50% by weight.

2 Claims, No Drawings

PROCESS FOR THE MANUFACTURE OF SHAPED ARTICLES BY GRAFT POLYMERIZATION

This is a continuation of application Ser. No. 497,328 filed Aug. 14, 1974, now abandoned.

This application discloses and claims subject matter described in German Patent Application P 23 41 556.7, filed Aug. 17, 1973, which is incorporated herein by reference.

This invention relates to a process for the manufacture of shaped articles of a mixture of polystyrene and an ethylene/vinyl ester, ethylene/acrylate or ethylene/methacrylate copolymer by swelling shaped articles of said ethylene copolymers with styrene in aqueous suspension and polymerizing the styrene at elevated temperature.

Processes for the manufacture of graft polymers of styrene and ethylene/vinyl ester, ethylene/acrylate or ethylene/methacrylate copolymers are well known. For example, the said ethylene copolymers are dissolved in styrene and the styrene is polymerized in the usual manner after dispersing the solution in water. In all cases, the amount of ethylene polymer used is greater than that of styrene. These methods give powdered graft polymers.

According to another well-known process, shaped articles of ethylene/vinyl ester copolymers are caused to swell with a suspension of monomers, e.g. styrene in water, at room temperature. The monomer dispersed in the shaped article is then polymerized. This process, however, only permits the use of an amount of monomer which is less than that of the copolymer used.

It is an object of the present invention to provide a process of the kind described above but for the production of homogeneous shaped articles having a styrene content of more than 50% by weight.

This object is achieved in the present invention by using copolymers having a comonomer content of from 3 to 40% by weight and a melt index (190° C/2.16 kg) of from 0.1 to 50 g/10 min and introducing from 100 to 400 parts by weight of styrene for every 100 parts by weight of copolymer and carrying out the polymerization at temperatures of from 60° to 110° C in the presence of freeradical polymerization initiators.

The ethylene copolymers used in the process of the invention are known per se. They are prepared by polymerization of ethylene with vinyl esters, acrylates or methacrylates in the presence of free-radical polymerization initiators at temperatures of from 150° to 400° C and pressures above 500 atmospheres. The comonomer content of the ethylene copolymers is from 3 to 40% by weight. The melt index of the ethylene copolymers is from 0.1 to 50 and preferably from 3 to 20 g/10 min (as determined according to ASTM-D 1238-65 T).

The comonomers used include vinyl esters, preferably vinyl esters of saturated carboxylic acids of from 2 to 8 carbon atoms, e.g. vinyl acetate and vinyl propionate, acrylates and methacrylates derived from alcohols of from 1 to 20 carbon atoms, e.g. methyl acrylate, isopropyl acrylate, n-butyl acrylate and t-butyl acrylate and the corresponding methacrylates.

By shaped articles we mean granules of the ethylene copolymers. The granules have a particle diameter of from 2 to 6 mm. They are usually obtained by compounding following polymerization. However, differently shaped articles of similar dimensions may be used if desired.

The ethylene copolymer shaped articles are treated with styrene in aqueous suspension. From 10 to 100 parts by weight of styrene are used for every 100 parts by weight of water.

Preferably, the shaped articles of the appropriate ethylene copolymers are caused to swell in the presence of a polymerization initiator which has been dissolved in the styrene. Suitable polymerization initiators are those commonly used for the polymerization of styrene, e.g. peroxide compounds and azo compounds. A prerequisite is that these polymerization initiators be soluble in styrene. Advantageous initiators are those peroxide and azo compounds which have a half-life of from 2 to 20 hours at temperatures between 60° and 100° C.

The ethylene copolymers are caused to swell with the suspension of styrene in water at temperatures ranging from room temperature to 60° C. It is possible, however, to operate at lower or slightly higher temperatures. If the ethylene copolymer contains more than 20% by weight of comonomer, swelling is carried out at temperatures between 20° and 30° C, whilst temperatures of from 50° to 60° C are used for lower comonomer contents. These relatively high temperatures are also used when large amounts of styrene are added. Following swelling of the ethylene copolymer, which may take from 1 to 6 hours depending on the styrene content and comonomer content of the polymer, the mixture is heated to the polymerization temperature.

Under the aforementioned conditions, the styrene is absorbed almost completely by the ethylene copolymers. The reaction mixture is then heated to the required polymerization temperature. When the reaction temperature is from 60° to 110° C and preferably from 80° to 100° C, the reaction time is from 2 to 12 hours. This time depends not only on the temperature at which the reaction is carried out but also on the type of polymerization initiator used.

The process of the invention produces homogeneous products having styrene contents of from 50 to 80% by weight in the final product. Some of the styrene is directly grafted onto the ethylene copolymer, i.e. is chemically combined therewith. From 5 to 50% by weight of the styrene used is grafted onto the ethylene copolymer. The remainder of the styrene is present in the grafted ethylene copolymer in the form of a homopolymer in a state of very fine subdivision, the particle size being about $0.1\mu$. Total conversion, based on the styrene used, is from 98 to 99%. The invention is further illustrated with reference to the following Examples, in which parts are by weight.

EXAMPLE 1

100 parts of a copolymer of 88 parts of ethylene and 12 parts of vinyl acetate and having a melt index of 6 g/10 min (190° C/2.16 kg), 400 parts of water and 120 parts of styrene, in which 1 part of dibenzoyl peroxide is dissolved, are mixed in a stirred vessel. The ethylene copolymer is used in the form of granules having a diameter of 3 mm and a length of 5 mm. The reaction mixture is stirred for 2 hours at a temperature of 50° C, after which time all of the styrene has diffused into the ethylene copolymer. The mixture is then heated to a temperature of 80° C and held at this temperature for 4 hours. The temperature is then raised to 90° C and maintained at that value for 1 hour. The previously transparent granules take on an opaque sheen. The granules are filtered off and dried. Conversion, based on styrene, is 99%. The reaction product has a grafted portion of 20% by weight, based on styrene.

EXAMPLE 2

100 parts of a copolymer of 68 parts of ethylene and 32 parts of vinyl acetate having a melt index of 19 g/10 min (190° C/2.16 kg), 400 parts of water and 200 parts of styrene, in which 2 parts of dibenzoyl peroxide have been dissolved, are mixed in a vessel for 2 hours at room temperature and then for 4 hours at a temperature of 60° C. The mixture is then heated at a temperature of 80° C. Polymerization is complete after 10 hours. Conversion is 98%, based on styrene, and the grafted portion, based on styrene, is 24%. The granules used have a length of 4 mm and a diameter of 2 mm. The particle size of the polystyrene is determined with the aid of an electronic microscope and is found to be $0.1\mu$.

The reaction mixture of polystyrene and grafted ethylene/vinyl acetate copolymer may, for example, be converted to sheeting. No separation of the components occurs during further processing of the reaction product.

We claim:

1. A process for the manufacture of granules of a mixture of polystyrene and an ethylene/vinyl ester, ethylene/acrylate or ethylene/methacrylate styrene graft copolymer which comprises: swelling granules of said ethylene copolymers with styrene and polymerizing the styrene at elevated temperatures, wherein copolymer granules with a particle diameter of from 2 to 6 mm, having a comonomer content of from 3 to 40% by weight and a melt index of from 0.1 to 50 g/10 min are used, and from 100 to 400 parts by weight of styrene are used for every 100 parts by weight of said copolymer, swelling of said copolymer by styrene being carried out at a temperature of from 20° to 60° C over a period of from 1 to 6 hours in aqueous suspension, and polymerization being carried out at temperatures between 60° and 110° C in the presence of free-radical polymerization initiators.

2. A process as set forth in claim 1 wherein the granules of a mixture of polystyrene and an ethylene/vinyl ester, ethylene/acrylate or ethylene/methacrylate styrene graft copolymer are homogeneous products having styrene contents of from 50 to 80% by weight based on the weight of the final product in which from 5 to 50% by weight of the styrene in the product is grafted onto the ethylene copolymer and the remainder of the styrene is present in the grafted ethylene copolymer in the form of a homopolymer in a state of very fine distribution, the particle size being about $0.1\mu$.

* * * * *